Sept. 13, 1932.    H. B. SHEFFIELD    1,876,769
APPARATUS FOR CORRECTING VISION
Filed Jan. 23, 1931
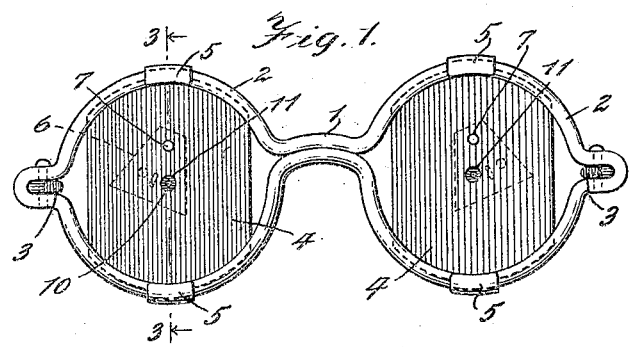
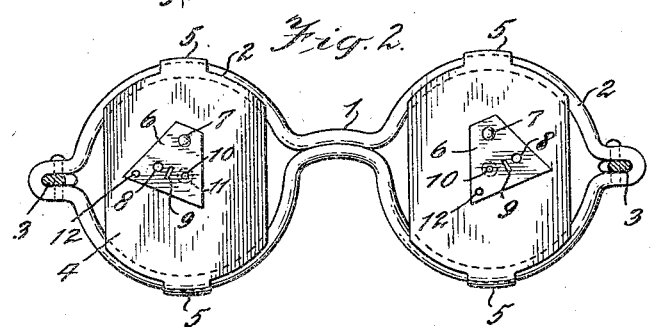
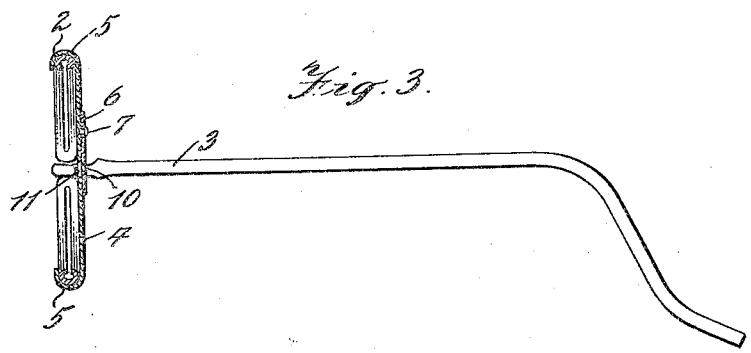
INVENTOR
Herman B. Sheffield
BY
ATTORNEYS Patented Sept. 13, 1932

1,876,769

UNITED STATES PATENT OFFICE

HERMAN B. SHEFFIELD, OF NEW YORK, N. Y.

APPARATUS FOR CORRECTING VISION

Application filed January 23, 1931. Serial No. 510,622.

This invention relates to a novel and improved apparatus by means of which vision may be corrected, without the use of lenses, although the invention may also be practiced in conjunction with lenses, under some circumstances.

The novel features of the invention will be best understood from the following description and the annexed drawing, in which:

Fig. 1 is a front view of an ophthalmic frame having one embodiment of the apparatus applied thereto;

Fig. 2 is a rear view of the apparatus shown in Fig. 1;

Fig. 3 is a section on the line 3—3 of Fig. 1.

In the drawing, the invention is shown as practiced by an embodiment of an apparatus which may be mounted upon an ophthalmic frame of any suitable character. For purposes of illustration, I have indicated a frame having a bridge 1 connecting rims 2 which surround openings adapted to be placed in front of the wearer's eyes. The frame may be secured on the head by any of the usual and suitable means, here exemplified as temples 3. Since the details of the frame are immaterial, further description thereof will be omitted.

I have shown the lenses as being omitted from the frame and replaced by shields which are shown as of identical construction, and the description will, therefore, be limited to one of these shields. It is to be understood that while shields are shown as identical, it is contemplated that it may be necessary to make the detailed construction of one shield different from that of the other in order to better correct the vision of the separate eyes of the wearer.

The apparatus which I use in practice of the invention comprises a shield 4 having hooks 5 engaging the rim 2. By this arrangement, the shield may be quickly, easily, and securely fastened to the rim, and as easily and quickly removed therefrom. The shield may be of any suitable material and is preferably, although not necessarily, placed on the back of the frame so that it will not be so conspicuous and so that it will not be in so much danger of accidental displacement. If desired, the front of the shield may be colored a light gray with an outline of the iris to resemble a lens, and the back, which is next the eye, is preferably painted black.

Movably mounted on the shield, and preferably on the back thereof, is a diaphragm 6 which may be supported on a pivot 7. This diaphragm may conveniently be provided with a plurality of apertures 8, 9, and 10, these apertures being shown as of varying size and shape. The shield is provided with an aperture 11, which is relatively large with respect to the apertures 8, 9, and 10, and these apertures 8, 9, and 10 are preferably equi-distant from the pivot 7 and at the same distance from that pivot as is the aperture 11, so that, when the diaphragm is moved on its pivot, any one of the several apertures 8, 9, and 10 may be brought into registry with the aperture 11. Preferably, the diaphragm is mounted on its pivot with sufficient tightness so that it will stay in any one of its adjusted positions, without the necessity of other means to hold it in such position, although, of course, if found desirable or necessary, such other means may be provided within the scope of my invention. A suitable handle 12 may be provided for convenient movement of the diaphragm.

With the above arrangement, it will be seen that the eye is shielded from practically all strong direct light. In actual practice, I find that the horizontal width of the shield can be made four-fifths of the diameter or horizontal dimension of the lens rim 2, and this will result in shielding the eye from substantially all direct light, except such as may pass through the apertures referred to above. The size of the aperture for the individual eye may be determined by test and the proper diaphragm selected in accordance therewith.

By the use of the slit 9, astigmatism may be corrected, the diaphragm being moved on its pivot to bring the slit 9 into registry with the aperture 11. Since the aperture 11 is substantially larger than the slit, the angle of the slit with respect to the axis of the eye may be varied to correct the particular case of astigmatism. If necessary, a shield with a larger aperture 11 may be provided. In extreme cases of astigmatism, the proper position of the slit may be obtained by gradually revolving the entire shield on the frame until the right position is reached. Moreover, it should be understood that in this connection, as well as in connection with the apertures which are shown as being round, the diaphragm may be omitted entirely and separate shields with different sizes and shapes of aperture may be substituted, to meet the needs of the individual. The arrangement shown, however, cuts down the number of shields necessary.

I have found by actual test that the use of my invention, which eliminates substantially all direct light, except that passing through the small aperture, makes it possible to do away with corrective lenses altogether in many instances, and in other instances I have found that it is possible to use lenses of several dioptres less strength. It also materially accentuates the outlines of objects viewed by the wearer. I have also determined by actual test that the slit may be used to correct cases of astigmatism. Presumably this result is because the apparatus acts on the principle of the camera, the aperture admitting only so much light as is needed to project the image on the retina of the eye. In actual practice, I have found that the invention is of particular use in, although not limited to, cases of congenital irideremia, albinism, and permanent dilation of the pupil following disease or operation. For example, after some operations, like the one for large iridectomy in glaucoma, the muscles of the eye cannot act to focus the lens for the purposes of accommodation. Then, when the eye is subjected to intense light, it cannot accommodate itself, and allows too much light to enter the inner eye, causing an intense glare or dazzle, which confuses or effaces the image on the retina.

The theory upon which my invention works may be that, with the eye shielded from substantially all direct light, the muscles of the eye may relax and, in fact, will automatically relax to more nearly a normal condition and, of course, in relaxing, change the curvature of the lens of the eye to more nearly its normal condition. In other words, the shield constructed according to my invention acts as an adjustable artificial pupil. Of course, this theory would govern only cases where the muscles had not been cut during an operation.

While the invention is of use for vision corrective purposes, it may also be used as a shield alone. The invention has been shown as embodied in a specific form, but it is to be understood that various changes in details may be made without departing from the scope of the invention, and I therefore do not intend to limit myself except by the appended claims. For example, while I have shown the vertical edges of the shields as spaced from the rims so as to permit the eye to see on either side of the shield for convenience when wearing out of doors, nevertheless the shield may entirely close the opening in the frame, if so desired.

I claim:

1. A vision correcting device comprising an eye shield having a small aperture therein, means to support said shield on the head of the wearer adjacent the eye whose vision is to be corrected and with said aperture substantially on the axis of said eye, and a diaphragm mounted on a pivot on said shield with said pivot spaced from said aperture, said diaphragm having therein a slit spaced from the pivot a distance substantially equal to the distance between said pivot and said aperture, whereby upon moving the diaphragm on its pivot said slit may be brought into registry with said aperture and its angle with respect to the axis of the eye may be varied.

2. A vision correcting device comprising an opthalmic frame having an opening adapted to be placed in front of the eye of the wearer, an eye shield mounted on said frame and having oppositely disposed vertical edges spaced from the frame and on opposite sides of the axis of the wearer's eye, said shield having an opening therein substantially in line with said axis, and a diaphragm mounted on a pivot on said shield with said pivot spaced from said aperture, said diaphragm having therein a slit spaced from the pivot a distance substantially equal to the distance between said pivot and said aperture, whereby upon moving the diaphragm on its pivot said slit may be brought into registry with said aperture and its angle with respect to the axis of the eye may be varied.

HERMAN B. SHEFFIELD.